3,557,234
PRODUCTION OF ETHYLBENZENE AND
BENZENE FROM TOLUENE
Joseph Peter Henry, South Charleston, and Roger Harry
Garst, St. Albans, W. Va., assignors to Union Carbide
Corporation, New York, N.Y., a corporation of New
York
No Drawing. Filed Dec. 27, 1968, Ser. No. 787,620
Int. Cl. C07c 15/04
U.S. Cl. 260—668                                      12 Claims

ABSTRACT OF THE DISCLOSURE

Ethylbenzene and benzene are produced from toluene by a unique process which comprises first coupling the toluene under the influence of heat, using elemental sulfur. The products of the coupling reaction are bibenzyl, stilbene and some sulfur-containing compounds. The entire product of the coupling reaction is then subjected to a combined hydrodesulfurization and hydrodealkylation reaction to produce ethylbenzene and benzene as the ultimate major products.

---

The present invention relates to a novel and unique process for the production of benzene and ethylbenzene from toluene. It is particularly related to the coupling of toluene, using elemental sulfur to produce bibenzyl, stilbene and some sulfur-containing by-products, followed by the hydrodesulfurization and hydrodealkylation of the products of the coupling reaction to produce benzene and ethylbenzene.

Increased demand for polystyrene in recent years has necessitated increased production of monomeric styrene. The principal industrial source for making styrene is the catalytic dehydrogenation of ethylbenzene. Therefore, a continuous and large supply of ethylbenzene is necessary to insure an adequate supply of styrene. The chief known method of producing ethylbenzene is the reaction of benzene and ethylene in the presence of a Friedel-Craft-type catalyst. Some ethylbenzene is also produced by the superfractionation of mixed $C_8$ aromatic hydrocarbons derived from BTX (benzene, toluene and xylene) fractions. However, the reaction of benzene and ethylene in the presence of a Friedel-Craft-type catalyst is probably the major, if not the principal industrial source of production of ethylbenzene.

It is evident therefore that continued supply of ethylbenzene depends upon the availability of both benzene and ethylene in sufficient quantites. However, ethylene has been used extensively in the manufacture of some basic chemicals (e.g., ethylene oxide) and plastics (e.g., polyethylene). Accordingly, the trend appears to be toward higher consumption of available ethylene for other industrial processes and therefore less availability for the manufacture of ethylbenzene.

The availability of benzene has also become somewhat limited. Only a limited amount of benzene is available from BTX fractions. The supplemental source of benzene has been the hydrodealkylation of toluene. However, this hydrodealkylation reaction is accompanied by loss of the methyl group to methane which is a low value by-product. Therefore, the production of benzene by this route is of marginal economic interest.

Accordingly, this invention provides an alternate and unique method of producing both ethylbenzene and benzene from toluene as the starting hydrocarbon raw material. The only other major raw material which is required is an initial inventory of elemental sulfur plus a small quantity of make-up sulfur as will become apparent hereafter from the description of the process of this invention.

Basically, and in its broadest aspect, the process of this invention comprises two principal reaction steps. In the first reaction step two molecules of toluene are coupled using elemental sulfur under the influence of heat alone without the aid of a catalyst. The principal products are bibenzyl and stilbene although some sulfur-containing by-products are also produced in relatively minor amounts. In the second reaction step bibenzyl and stilbene, or bibenzyl, stilbene and the sulfur-containing by-products of the coupling reaction are hydrodesulfurized and hydrodealkylated to produce benzene and ethylbenzene as the major products.

The coupling of toluene by reaction with sulfur has been known for some time. Thus Renard, Bull. Soc. Chem. 3, 958 (1889); 5, 278 (1891) described the coupling reaction of toluene using sulfur under the influence of heat. Horton, J. Org. Chem., 14, 761 (1949) discusses the types of products produced by the coupling of toluene with sulfur and explains the mechanism of the coupling reaction.

Hydrodesulfurization and hydrodealkylation reactions per se are also well known as evidenced by the numerous patents and other publications relating to these types of reactions. For example, a general review of hydrodealkylation may be found in an article entitled, "Hydrodealkylation," Advances in Petroleum Chemistry and Refining, vol. IX, Inter-Science Publishers, 1964, p. 4 and a similar review is also found in an article entitled, "Naphthalene from Petroleum," Advances in Petroleum Chemistry, vol. X, Inter-Science Publishers, 1965, p. 219.

A recent Netherlands Pat. No. 6608758 describes a dealkylation process which employs a catalyst consisting of solid particles of a non-acidic carrier material containing an active component selected from Group VI or VII of the Periodic Tables of Elements.

U.S. 2,951,886, issued Sept. 6, 1969 describes the hydrogen treatment of a sulfur-containing coal tar light oil at 650° C., using chromic oxide catalyst supported on high-purity, low-sodium content gamma-alumina. The hydrogen treatment disclosed in this patent results in some desulfurization and demethanization of the light oil.

A combined dealkylation-hydrodesulfurization process is described by Tarkan and Waidsor, Chem. Eng., 96 (1966). The process disclosed therein is otherwise known as the "Litol Process" is carried out at 500°–600° C., using chrome-alumina and cobalt-molybdate catalyst.

U.S. 3,062,903, issued Nov. 6, 1962 discloses that bibenzyl may be catalytically cracked in the presence of silica-alumina catalyst to produce a mixture of benzene and styrene. However, this patent does not disclose the use of a catalyst containing a hydrogenation component (which as will hereinafter be explained constitutes an essential ingredient of the second principal reaction in the process of this invention), nor does it require the presence of hydrogen during the cracking reaction. Furthermore, the principal products produced in the process disclosed in this patent are benzene and styrene at approximately 2:1 weight ratio. Little or no ethylbenzene is produced during this reaction.

Thus, it is evident that while there are numerous patents and publications relating to sulfur coupling of toluene and there is an abundance of literature relating to hydrodealkylation and hydrodesulfurization reactions per se, there is no known method for the production of ethylbenzene and benzene from toluene and sulfur as the starting materials.

The first principal reaction step of the process of this invention may be represented as follows:

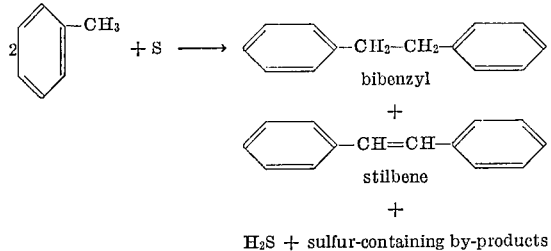

bibenzyl
+
stilbene
+
$H_2S$ + sulfur-containing by-products

The sulfur-containing by-products are generally complex aromatic compounds such as the derivatives of thiophene. The principal by-products are dibenzyldisulfide, 2-phenylbenzothiophene, 1,2,3,4-tetraphenylbutane, o-bitolyl and symmetrical tetraphenylthiophene. The by-products which include some sulfur-containg compounds will hereinafter be referred to collectively as "residue."

In the second principal reaction step of the process of this invention, bibenzyl and stilbene, or bibenzyl, stilbene and the residue are both hydrodesulfurized and hydrodealkylated to produce benzene and ethylbenzene as the major products. The hydrodesulfurization and hydrodealkylation reactions are carried out simultaneously and will therefore be referred to as "hydrotreatment" or "hydrotreating" throughout this application. If desired, the hydrodesulfurization and hydrodealkylation reactions may be carried out separately in which case the products of the coupling reaction are preferably first hydrodesulfurized and the resulting hydrodesulfurized products are then hydrodealkylated to benzene and ethylbenzene.

The coupling reaction is carried out in the liquid phase and under the influence of heat. It is preferably carried out under conditions which would maximize the combined production of bibenzyl and stilbene with a corresponding minimum formation of the residues.

The aforesaid coupling reaction must be carried out at a temperature below the critical temperature ($T_c$) of toluene (318.6° C.). However, it is advantageous to carry out this reaction at a temperature of from about 250° C. to about the critical temperature of toluene and is preferably conducted at a temperature of from about 280° C. to about the $T_c$ of toluene.

The pressure per se is not narrowly critical on the coupling reaction so long as the reactants are maintained in the liquid phase. Generally, the minimum pressure at which this reaction is carried out is at least the same as the vapor pressure of toluene under the prevailing reaction conditions. Pressures as high as about 2000 p.s.i.g. or even higher may be employed though there is no particular advantage in carrying out this reaction at such higher pressures.

The residence time of the coupling reaction must be sufficient to consume essentially all the elemental sulfur in the reaction zone. Thus, at least several minutes are usually required, and in most cases a residence time of from about 5 minutes to about 2 hours has been found to be sufficient for consumption of essentially all the elemental sulfur in the reaction.

Bibenzyl and stilbene are the principal source of the ethylbenzene produced in the second reaction step of the process of this invention. Accordingly, the coupling reaction is preferably conducted under conditions which would maximize the formation of bibenzyl and stilbene and minimize the formation of the residues. Thus, it has been discovered that increased yields to stilbene and bibenzyl can be obtained when the toluene-to-sulfur ratio is at least about 2:1 moles of toluene per gram atom of elemental sulfur and is preferably from about 4:1 to about 20:1 moles of toluene per gram atom of elemental sulfur.

The elemental sulfur is initially supplied from an outside source. Once the process of this invention is underway, only a small amount of make-up sulfur is furnished from an outside source since the bulk of the required sulfur is recovered from the hydrogen sulfide produced during the coupling reaction and the second principal reaction step of this process.

The coupling reaction may be carried out continuously, semi-continuously or in batchwise manner. In continuous operation, the requisite amount of sulfur is dissolved in toluene and the resulting solution is then introduced into the reaction zone where the coupling reaction is carried out at the desired reaction conditions. The effluent from this reaction zone is subjected to a product recovery section where unreacted toluene is first recovered by distillation and recycled to the coupling reaction zone. The toluene-free reaction products are then sent directly to a second reaction zone where they are hydrotreated as will hereinafter be described. If desired, this toluene-free reaction product may be distilled to recover bibenzyl and/or stilbene from the residue.

The following examples will serve to illustrate the first principal reaction step of the process of this invention.

EXAMPLE 1

A mixture of toluene and sulfur (9 moles of toluene per one gram atom of sulfur) was charged to a one-liter autoclave and the autoclave was then sealed and purged with nitrogen until all the air was removed therefrom. The mixture was then heated to 300° C. and 670 p.s.i.g. (combined pressure of nitrogen and toluene vapors) and maintained at this temperature for 120 minutes during which time the pressure was observed to increase to 735 p.s.i.g. Thereafter, the reaction mixture was rapidly cooled to ambient temperature and the hydrogen sulfide produced by the reaction was purged with nitrogen and the effluent was scrubbed with cadmium sulfate to quantitatively remove the hydrogen sulfide. Thus, the weight of hydrogen sulfide produced in the coupling reaction was determined by the increase in weight in the scrubber and by the amount of sulfuric acid formed by the reaction of hydrogen sulfide and cadmium sulfate as follows:

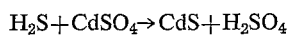

The liquid content of the autoclave was withdrawn, distilled into several fractions, weighed and analyzed by vapor-phase chromatography. The experimental conditions and the results obtained in this example as well as in Examples 2 to 4 are shown in Tables I and II, respectively.

EXAMPLE 2

The procedure in this example was essentially the same as in Example 1 except that the contents of the autoclave were purged with nitrogen during the reaction at the rate of 100 cc./minute.

EXAMPLE 3

The procedure in this example was essentially the same as in Example 1 except that 4.2 moles of toluene were employed per gram atom of sulfur.

EXAMPLE 4

The procedure in this example was essentially the same as in Example 1 except that the reaction time was 30 minutes.

The results of the foregoing examples indicate that a combined efficiency to bibenzyl and stilbene as high as 76.1 weight percent (Example 1) can be obtained in the coupling reaction. It is further noted that the removal of hydrogen sulfide from the coupling reaction zone reduces the residence time required for the reaction as it is evident from a comparison of Examples 2 and 4.

TABLE I.—EXPERIMENTAL CONDITIONS

| Examples | Reaction time, minutes | Toluene/sulfur, moles/gram atom | Temperature, °C. | Pressure, p.s.i.g. | Nitrogen purge rate, cc./minute |
|---|---|---|---|---|---|
| 1 | 120 | 9.0 | 300 | 670–735 | None. |
| 2 | 15 | 9.0 | 300 | 550 | 100. |
| 3 | 120 | 4.2 | 300 | 690–875 | None. |
| 4 | 30 | 9.0 | 300 | 770–820 | None. |

TABLE II.—EXPERIMENTAL RESULTS

| | Toluene conversion,[a] weight percent | Efficiencies, weight percent [b] | |
|---|---|---|---|
| | | Combined stilbene and bibenzyl | Residues |
| Example: | | | |
| 1 | 15.5 | 76.1 | 23.9 |
| 2 | 11.6 | 71.5 | 28.5 |
| 3 | 26.2 | 61.5 | 38.5 |
| 4 | 10.5 | 60.2 | 39.8 |

[a] Determined by distillation of a known weight of the products of the coupling reaction.
[b] Calculated as follows:
Percent efficiency = $\frac{\text{weight percent of compound in the total recovered product}}{\text{weight percent toluene conversion}} \times 100$ The foregoing examples illustrates the coupling reaction of this invention in batchwise manner. However, this reaction can also also be carried out continuously as illustrated in Example 5 below.

EXAMPLE 5

One mole of sulfur was dissolved in 10 moles of toluene and the resulting solution was fed to the top of a reactor at a liquid hourly space velocity (LHSV) of 2. The reactor was a one-inch stainless steel tube, 36 inches long and packed with Filtros packing. The reaction carried out at 290°–305° C. and 450 p.s.i.g. while continuously purging the reactor with a countercurrent stream of nitrogen at the rate of 300 cc./minute.

The toluene conversion in this example was 5.3 weight percent and the combined efficiency to bibenzyl and stilbene was 47.1 weight percent.

As was previously indicated, the second principal reaction step in the process of this invention is the hydrotreatment of the products of the coupling reaction to produce ethylbenzene and benzene as the major products. Thus, the practical efficiency of the coupling reaction is essentially 100 percent since the entire products of the coupling reaction can be hydrotreated to produce ethylbenzene and benzene.

The hydrotreating reaction is carried out by diluting the products of the coupling reaction with a suitable diluent and thereafter passing the diluted mixture through a hydrotreated zone containing a suitable hydrotreating catalyst and effecting the conversion to ethylbenzene and benzene under hydrotreating conditions. Although diluents such as toluenes and xylenes may be employed in this reaction, benzene is preferably used for this purpose since the ultimate desired products are ethylbenzene and benzene. For example, if toluene is used as the diluent the resulting hydrotreated products will contain a substantial quantity of methylethylbenzene which is an undesirable product for the purpose of this invention. It has been found that ethylbenezene and benzene constitute the major hydrotreated products only when benzene is employed as the diluent.

It should be further emphasized that as a practical matter the hydrotreating reaction is most advantageously carried out in the presence of diluent, i.e., benzene. Otherwise, transalkylated products such as diethylbenzene and ethylbibenzyl will be produced which will detract from the yields of the more desirable ethylbenzene and benzene. Thus the weight ratio of the diluent to the products of the coupling reaction (bibenzyl, stilbene and residues) can vary from about 0 to about 10:1 but it is preferably from about 1:1 to about 5:1. The dilution ratio of zero obviously corresponds to those operations in which a diluent is not employed.

The catalysts which are suitable for the hydrotreating reaction of this invention are those which can promote the hydrodesulfurization of the residues while simultaneously promoting the hydrodealkylation of bibenzyl, stilbene and the hydrodesulfurized products. Although catalysts for hydrodesulfurization and hydrodealkylation per se are known in the petroleum industry, not all of these catalysts have been found suitable or effective for the present hydrotreating reaction. In fact, it has been discovered that only those catalysts which posses certain unique characteristics can be effectively employed for the hydrotreatment of the products of the sulfur coupling reaction.

Basically, the catalysts which are uniquely suitable for the second principal reaction step of this invention consist of a hydrogenation component and an active acidic component generally used as a support for the hydrogenation component. Furthermore, it is essential that the hydrogenation component of the catalyst is not poisoned by sulfur during the reaction. Otherwise, its activity will be either greatly impaired or destroyed.

Several of the heretofore known hydrodesulfurization catalysts have been investigated as the hydrogenation component of the catalyst for the hydrotreatment reaction. These included chromium oxide ($Cr_2O_3$), tungsten oxide ($WO_3$), vanadium pertoxide ($V_2O_5$), stannous and stannic sulfide (SnS and $SnS_2$), titanium dioxide ($TiO_2$), ferric oxide ($Fe_2O_3$), metallic iron, ferrous sulfide (FeS) and vanadium trisulfide ($V_2S_3$). However, among these hydrodesulfurization catalysts, only chromium oxide, tungsten oxide and vanadium oxide have been found to be suitable for the combined hydrodesulfurization-hydrodealkylation of the products of the coupling reaction. Accordingly, any one or a mixture of these three oxides can be employed as the hydrogenation component of the catalyst.

The active, acidic component of the catalyst generally constitutes a support for the hydrogenation component. Exemplary such acidic materials include silica-alumina, metal-exchanged and/or decationized molecular sieves, acid-treated bentonite-type clay, acid-treated kaolinite-type clay, alumina-boria, magnesia-silica, boron phosphate, or any mixture thereof. These materials may be used in granular or pelletized forms, if desired. The exact form and configuration and the particle size of these supports are not per se critical as far as this invention is concerned.

The hydrogenation component is either impregnated into the active acidic material or it is otherwise adsorbed thereon by any of the conventional methods. The amount of the hydrogenation component in the catalyst must be sufficient to promote complete saturation of the double bonds formed during the hydrodealkylation reaction and to insure completion of the hydrodesulfurization reaction. The optimum amount of the hydrogenation component depends, to a large extent, upon the active acidic ingredient which is employed. In general, satisfactory catalytic performance is realized when the catalyst contains from about 5 to about 40 weight percent, preferably from about 10 to about 25 weight percent of hydrogenation component based on the total weight of the catalyst.

The hydrotreating step can be carried out continuously, semicontinuously or in batchwise manner. In continuous operation, the feed (entire product of the coupling reaction, i.e., bibenzyl, stilbene and the residues) is diluted with benzene and the diluted mixture is passed through a fixed-bed of one of the aforesaid catalysts in a hydrotreating zone, while continuously withdrawing the hydrotreated products therefrom. Hydrogen sulfide is first removed from the reactor effluent and is converted to sulfur and $H_2O$ by any of the prior art methods. As was previously mentioned, the elemental sulfur so recovered can be recycled to the coupling reaction zone. The hydrogen sulfide free reactor effluent is thereafter subjected to a product recovery section in order to recover ethylbenzene and benzene in the conventional manner. If desired, the unconverted reactants can be recycled to the hydrotreating zone.

It has been discovered that the temperature at which the instant hydrotreating reaction can be carried out is significantly less than the temperatures heretofore employed in a conventional industrial hydrodealkylation process. In fact if such conventional hydrodealkylation temperatures are employed, considerable amount of toluene will be produced by the thermal decomposition of bibenzyl. The production of toluene in the present hydrotreating reaction is of course undesirable since the ultimate desired products are ethylbenzene and benzene, particularly the former. In general, it has been found that the second principal reaction step of the process of this invention can be conveniently effected at a temperature of from about 300° C. to about 550° C., preferably from about 350° C. to about 450° C.

The pressure in the hydrotreating reaction is not per se critical though it should be at least about 200 p.s.i.g. in order to insure adequate desulfurization and catalyst life. Pressures as high as about 2000 p.s.i.g. may be employed. Higher pressures are neither economical nor contribute to the overall efficiency of this reaction step.

The liquid hourly space velocity of the feed (diluted mixture) to the hydrotreating reaction zone can vary from about 0.1 to about 10, preferably from about 1 to about 5 depending upon the other reaction conditions.

The hydrogen-to-hydrocarbon mole ratio can also vary depending upon the other reaction conditions and is generally from about 2:1 to about 30:1, preferably from about 4:1 to about 20:1 moles of hydrogen per mole of hydrocarbon. The term, "hydrocarbon" in this context refers to the diluted feed to the hydrotreating reaction zone.

The ethylbenzene and benzene produced by the foregoing hydrotreating reaction may be separated from the other reaction products by distillation, extraction, absorption or other conventional procedures. Essentially all the stilbene is converted into bibenzyl in the instant hydrotreating reaction. Bibenzyl and the residues may be recycled to the hydrotreating zone to thereby achieve increased production of ethylbenzene and benzene.

EXAMPLE 6

This example illustrates the hydrotreatment of the products of the coupling reaction of toluene with sulfur.

141 moles of toluene and 16.4 gram atoms of sulfur were charged to a 5-gallon Magna-Drive stainless steel autoclave which was heated to 300° C. during which time the pressure rose to 300 p.s.i.g. The reaction was carried out at 300° C. for 2 hours and the pressure was observed to increase to 2500 p.s.i.g. due to the vapor pressures of toluene and hydrogen sulfide. After the reaction period of 2 hours, the autoclave was cooled to ambient temperature. The remaining pressure in the autoclave was vented and the liquid content was purged with nitrogen and then transferred from the autoclave to a large glass still where unreacted toluene was distilled off. The toluene-free liquid product was analyzed by gas-chromatography and the results are shown in Table III below.

TABLE III

| Compound: | Weight percent |
| --- | --- |
| Bibenzyl, stilbene | 80.4 |
| 2-phenylthiophene | 1.33 |
| Triphenylpropane | 8.99 |
| Tetraphenylbutane | 0.81 |
| Heavy residues | 8.63 |
| | 100.00 |

Approximately 7 gallons of products having the composition indicated in Table III were prepared in two reaction batches and the entire product was then diluted with benzene at benzene-to-products weight ratio of 3:1. The resulting mixture constituted the hydrocarbon feed in the hydrotreating operation.

The hydrotreating apparatus basically consisted of a storage vessel for the hydrocarbon feed, a reactor, a liquid-vapor separator, pressure traps, atmospheric trap and their associated instruments. The reactor was a one-inch schedule 80 stainless steel pipe, 32 inches long. The reactor was unpacked at its upper section followed by several inches of inert Filtros packing, 5 inches of catalyst and several inches of the same packing at the bottom of the reactor.

The catalyst was silica-alumina impregnated with chromia. It was prepared by impregnating dried silica-alumina with an aqueous solution of chromium trioxide ($CrO_3$) which was reduced with hydrogen to chromium oxide ($CrO_3$). Thus the resulting chromium oxide constituted 16 weight percent of the finished catalyst.

The liquid hydrocarbon feed was withdrawn from the storage vessel and pumped to the top of the reactor. Hydrogen, preheated to 200° C. was also introduced at the top of the reactor at an average rate of 11.5 cubic feet per hour. Both hydrogen and the liquid hydrocarbon feed passed downwardly through the reactor which was maintained essentially at 425° C. and 400 p.s.i.g.

The hydrotreating reaction was carried out for 112 hours with two interruptions for the purpose of regeneration of the catalyst. The first interruption was after 51 hours of operation and the second after 74 hours. In the first regeneration period, the reactor was purged with hydrogen at 425° C. and atmospheric pressure for 5 hours. In the second regeneration step air was used to completely reactivate the catalyst over a period of approximately 12 hours.

The reactor effluent was introduced into the liquid-vapor separator which was maintained under pressure and a temperature of 25° C. to condense nearly 90 weight percent of the organic materials in the reactor effluent. The uncondensed vapors from the liquid-vapor separator were condensed in a series of pressure traps and finally in a cold trap maintained at −75° C. Approximately 7639 grams of liquid products were collected from the liquid-vapor separator and the various traps. This represents 99.36 weight percent recovery of liquid product based on the feed weight of 7688.5 grams.

The liquid product from the hydrotreatment reaction was then analyzed by gas chromatography. These results calculated on a diluent-free basis are shown in Table IV below.

TABLE IV

| Compound: | Weight percent |
| --- | --- |
| Benzene | 18.24 |
| Toluene | 5.16 |
| Ethylbenzene | 7.58 |
| Methylethylbenzene | 0.16 |
| Diethylbenzene | 2.92 |
| Bibenzyl | 62.51 |
| Ethylbibenzyl and other transalkylated products | 1.39 |
| Triphenylpropane | 0.77 |
| Tetraphenylbutane | 0.77 |
| Heavy residues | 0.50 |
| | 100.00 |

The above table indicates that the liquid product contains considerable amount of bibenzyl. However, it must be reiterated that the bibenzyl may be recycled to the hydrotreating reaction zone to produce additional benzene and ethylbenzene.

What is claimed is:
1. A process for producing ethylbenzene and benzene from toluene as the hydrocarbon starting material, which process comprises:
(a) coupling toluene in the liquid phase using ele- mental sulfur as the coupling agent at a temperature of from about 250° C. to about the critical temperature of toluene, using a toluene-to-sulfur ratio of at least about 2:1 moles of toluene per gram atom of sulfur thereby producing bibenzyl, stilbene, sulfur-containing by-products and sulfur-free by-products as the products of the coupling reaction, (b) recovering said products of the coupling reaction and diluting the same with from 0 to about 10 times its weight of benzene, (c) passing said diluted mixture and hydrogen through a hydrotreating zone containing a catalyst comprising essentially a hydrogenation component and an active, acidic component, said hydrogenation component being chromium oxide, tungsten oxide or vanadium oxide, or any mixture thereof and said active, acidic component being silica-alumina, metal-exchanged and/or decationized molecular sieves, acid-treated bentonite type clays, acid-treated kaolinite type clays, alumina-boria, magnesia-silica or boron phosphate, or any mixture thereof, (d) effecting said hydrotreating reaction at a temperature of from about 300° C. to about 550° C., a liquid hourly space velocity of from about 0.1 to about 10 a hydrogen-to-hydrocarbon mole ratio of from about 2:1 to about 30:1, and (e) recovering ethylbenzene and benzene from the hydrotreated products.

2. The process of claim 1 wherein said toluene-to-sulfur ratio is from about 4:1 to about 20:1 moles of toluene per gram atom of sulfur.

3. The process of claim 1 wherein the weight ratio of benzene to said products of the coupling reaction is from about 1:1 to about 5:1.

4. The process of claim 2 wherein the weight ratio of benzene to said products of the coupling reaction is from about 1:1 to about 5:1.

5. The process of claim 1 wherein said hydrogenation component is chromium oxide and said active, acidic compound is silica-alumina.

6. The process of claim 2 wherein said hydrogenation component is chromium oxide and said active, acidic component is silica-alumina.

7. The process of claim 3 wherein said hydrogenation component is chromium oxide and said active, acidic component is silica-alumina.

8. The process of claim 4 wherein said hydrogenation component is chromium oxide and said active, acidic component is silica-alumina.

9. The process of claim 1 wherein said hydrotreating reaction is carried out at a temperature of from about 350° C. to about 450° C., a liquid hourly space velocity of from about 1 to about 5 and a hydrogen-to-hydrocarbon mole ratio of from about 4:1 to about 20:1.

10. The process of claim 4 wherein said hydrotreating reaction is carried out at a temperature of from about 350° C. to about 450° C., a liquid hourly space velocity of from about 1 to about 5 (a hydrogen-to-hydrocarbon mole ratio of from about 4:1 to about 20:1.

11. The process of claim 9 wherein said hydrogenation component is chromium oxide and said active, acidic component is silica-alumina.

12. The process of claim 10 wherein said hydrogenation component is chromium oxide and said active, acidic component is silica-alumina.

References Cited

UNITED STATES PATENTS

| 2,282,327 | 5/1942 | Dreisbach | 260—668 |
| 2,338,973 | 1/1944 | Schmerling | 260—668X |
| 3,062,903 | 11/1962 | Odioso et al. | 260—668 |
| 3,373,217 | 3/1968 | Englebrecht et al. | 260—668 |

CURTIS R. DAVIS, Primary Examiner

U.S. Cl. X.R.

260—670